Patented Apr. 12, 1949

2,466,800

UNITED STATES PATENT OFFICE 2,466,800

OIL PHASE POLYMERIZATION OF RESINS

Charles F. Fisk, Clifton, N. J., assignor to United States Rubber Company, New York, N. Y., a corporation of New Jersey No Drawing. Application April 28, 1944, Serial No. 533,252

6 Claims. (Cl. 260—45.4)

This invention relates to improvements in the manufacture of products, and fabricated articles, from certain resins of the general class known as non-by-product-forming polymerizable resins. These resins are formed of liquid or semi-liquid polymerizable components which polymerize together, or interpolymerize, in what is known as the oil phase, without splitting off by-products, e. g., water, to form, eventually, hard resins. Usually, this reaction is expedited by the use of an oxygen-containing polymerization catalyst such as benzoyl peroxide, peroxides of aliphatic acids, ascaridole, and other organic peroxides, but even so temperatures of 50° C. to 125° C. are usually required for rapid gelation and polymerization.

It is the purpose of this invention to provide a practical means for greatly accelerating at temperatures below 50° C. the interpolymerization of unsaturated alkyd resins with monoenic compounds having a single terminal ethylenic group $CH_2=C<$. The speed with which these known systems polymerize can be regulated within certain limits by regulating the amount of oxygen-containing catalyst added and the temperature at which the polymerization is carried out. It is possible by such means to prepare systems which will polymerize in a few minutes at the higher temperature, i. e., 125° C., or in a few hours at the lower temperature, e. g., 50° C. It is also customary to add polymerization inhibitors to the liquid polymerization systems to prevent premature polymerization during storage but this desired storage stability is of necessity accompanied by a decrease in the overall rate at which polymerization takes place in the presence of the usual catalysts such as benzoyl peroxide. Thus it becomes necessary to use more catalyst to obtain a given rate of polymerization, than would be necessary with an uninhibited polymerization system.

While it is of course possible to accelerate the polymerization of certain systems containing no added inhibitors so that they will polymerize at temperatures below 50° C., in periods of time ranging from a few hours to several days, such an increase in polymerization speed means the sacrifice of the storage stability of the uncatalyzed polymerizable system. Such uninhibited systems tend to polymerize spontaneously on standing and to become unstable. Hence this method of increasing the rate of polymerization at temperatures below 50° C. is impractical.

An object of the invention is to provide certain chemical means (called herein promoters), adjunctive to said oxygen-containing catalyst, for promoting the gelation and thereby increasing the overall rate of polymerization, at temperatures below 50° C., and thereby giving to the liquid resinous mix cold-setting and cold-curing properties. It will be at once apparent that this permits new and improved fabricating techniques and speeding up of production. Of particular adaptability to this technique are the class of resins produced from polymerizable mixtures of unsaturated alkyd resins with mono-enic compounds having one terminal ethylenic group $CH_2=C<$, to which belong the resins represented by the polyethylene glycol-maleate-styrene copolymer resins, as covered by the Ellis U. S. Patents Nos. 2,255,313 and 2,195,362. These resins harden to form tough, non-cracking surfaces.

I have found that by using in conjunction with a conventional catalyst, such as benzoyl peroxide, a small amount of a promoter which is essentially a sulfhydryl compound, I can greatly increase the overall rate of polymerization at temperatures below 50° C. of polymerizable mixtures of unsaturated alkyd resins with mono-enic compounds having one terminal ethylenic group $CH_2=C<$. Furthermore, small amounts of these sulfhydryl compounds are effective in increasing the overall speed of polymerization of such polymerizable mixtures containing polymerization inhibitors at temperatures below 50° C. to such an extent that such systems can be polymerized in a few minutes. This rapid rate of polymerization is gained without any accompanying sacrifice in the storage stability of the polymerizable systems. Rapid polymerizations at low temperatures are thus made completely practical.

Polymerizable systems of the type to which my invention is applicable are commonly used in the fabrication of laminated articles composed of absorptive or porous sheet materials such as paper, cloth or fibrous glass impregnated with and bonded together with the solid polymer. In preparing these articles it is customary to impregnate or coat the porous sheet material with the liquid polymerizable mixture which has been prepared by known methods, so that it has the proper viscosity at the temperatures employed during application—usually about 25° C., or slightly higher. The impregnated sheet materials may then be plied together and formed to the desired shape. Heat is then applied to raise the temperature of the polymerizable mixture to a point where the polymerization will take place at a rapid enough rate. This temperature is usually well above 50° C. and usually in the neighborhood of 125° C.

While it is necessary to raise the temperature to speed up the polymerization of the mixture, this increase in temperature brings about an undesirable decrease in the viscosity of the liquid mixture, with the result that the liquid tends to flow away from spaces between the layers of fabric or paper leaving so-called "starved spots" or areas where there will be insufficient polymer in the finished article. This is also true in vertical areas. Difficulty has also been encountered in forming smooth surfaces on flat sheets with such resins.

On the other hand, by using a polymerizable mixture containing a catalyst and a sufficient amount of a sulfhydryl compound to cause rapid polymerization at temperatures below about 50° C., it is not necessary to raise the temperature above 50° C. in order to cause the mixture to set to a non-flowable state. Low-viscosity effects are thus avoided. It is thus possible to allow the mixture to set or gel at room temperature or slightly above and then, if desired, to complete the polymerization at an elevated temperature without causing unequal distribution of the resin (formation of starved areas), since no decrease in viscosity will take place.

While the principles of my invention are particularly useful in the production of laminated articles, they can be satisfactorily applied to the production of castings or coatings wherever it is desired to have rapid polymerization at low temperatures.

The polymerization of the systems involved in this invention takes place in several recognizable stages. The resin mixture remains quite fluid with little or no change in viscosity during a period of time called the "induction" period. After this the viscosity increases very rapidly until the material becomes a soft solid. The time to reach this stage is called the "gel time." The material, if undisturbed, continues to increase in hardness until a hard solid stage is reached.

In carrying out polymerizations in the oil phase, according to this invention, several procedures may be followed. It is preferred to dissolve the peroxide catalyst in the less viscous of the inhibited resin components, which is then mixed carefully with the other resin component. The promoter, that is, the sulfhydryl compound, may then be incorporated (shortly prior to carrying out the polymerization) directly in the mixture of resin components, catalyst, and inhibitor. The mixture is then ready for use in casting or for producing any such articles as are desired. (It has not been found practical to add the promoter to either of the resin components at a time long before use since the activity of the promoter is gradually destroyed on standing.)

If a casting is to be made, the mixture is poured into a previously prepared form and allowed to stand at temperatures ranging from 0 to 50° C. until the resin has polymerized at least to the gel point. If the resin is to be used for impregnating or coating, it is applied to the desired base material and may either be molded immediately and the gel allowed to form in the position desired, or the gel may be allowed to form in a horizontal position after which the article can be molded and the rest of the polymerization carried out at a higher temperature.

The base material, subject to impregnating or coating, may be in sheet, filament, or other form, and comprise materials of metal, vegetable, animal, mineral, or synthetic nature.

The mono-enic compounds used in the invention are those which are capable of addition polymerization and contain one and only one terminal $CH_2$ group doubly bonded to a carbon atom which in turn is bonded to at least one negative radical. Specific examples of such compounds are styrene in which the negative group is a phenyl radical, vinyl chloride in which it is the chloride radical, vinyl acetate in which it is the acetoxy radical, esters of acrylic and methacrylic acids in which it is a carbo-ester radical, acrylonitrile and methacrylonitrile in which it is the carbonitrile radical.

The unsaturated alkyds used in the invention are prepared in known manner by the reaction of polyhydric alcohols with $\alpha,\beta$-ethylenic dicarboxylic acids with or without the presence of modifying agents, such as monohydric alcohols, saturated monocarboxylic acids, saturated polycarboxylic acids, drying or semi-drying oils, etc. Unsaturated alkyds of this type are described in U. S. Patents Nos. 2,195,362 and 2,255,313.

The proportion in which the interpolymerizable components are mixed may be varied widely, e. g., the amount of the polyenic component, i. e., the unsaturated alkyd resin, may range from about 20% to about 95% of the mixture of interpolymerizable components.

The following are examples of suitable sulfhydryl compounds: hydrogen sulfide, ammonium hydrosulfide, sodium hydrosulfide, calcium hydrosulfide, n-hexyl mercaptan, n-heptyl mercaptan, n-octyl mercaptan, n-nonyl mercaptan, n-decyl mercaptan, n-undecyl mercaptan, n-dodecyl mercaptan, n-tridecyl mercaptan, n-tetradecyl mercaptan, n-hexadecyl mercaptan, secondary hexyl mercaptan, tertiary hexyl mercaptan, tertiary octyl mercaptan, mercaptoacetic acid $$(HS\text{---}CH_2COOH)$$

thioacetic acid ($CH_3.COSH$), p-toluenethiol, p-mercaptophenol, 2-mercaptobenzoic acid, 4-mercaptoquinazoline, thio-$\alpha$-toluamide, thioacetamide, thioacetanilide, 2-naphthalenethiol, cysteine hydrochloride, thiourea, trithiocyanuric acid, thiohydantoin, thiobarbituric acid.

The amount of promoter may be varied, depending on the specific character of the polymerizable resin, the specific catalyst, and the specific inhibitor. For any given system of inhibited polymerizable resinous mix, it will be found that as the amount of added promoter is increased, the gelling time is progressively reduced until it reaches a minimum, after which further amounts of the promoter provide an operative but less pronounced decrease in the gelling time, compared with control containing no added promoter. Generally, a usable range for the promoter ranges from .005 to 2.0 parts per 100 parts by weight of the liquid polymerizable mixture.

The following examples are given to further illustrate the invention, the parts being by weight:

EXAMPLE I

A reactive alkyd is prepared by reacting 1.05 mols of diethylene glycol with 1.00 mol of maleic anhydride (the use of the anhydride is equivalent to the use of the acid) at 170° C. in a carbon dioxide atmosphere until an acid number of 50 is attained. Two parts of benzoyl peroxide are dissolved in 30 parts of monomeric styrene containing 0.010 part of p-tertiary-butyl catechol (inhibitor). Seventy parts of the alkyd are then dissolved in the styrene solution by stirring. As soon as this mixture is homogeneous, 0.1 part of dodecyl mercaptan is added and the compound stirred for one minute. The comparative times in which gelation occurred are noted in Table I for the above compound, and for a compound to which benzoyl peroxide but no mercaptan is added, and for one to which neither mercaptan nor catalyst has been added.

TABLE I

|  | (1) | (2) | (3) |
|---|---|---|---|
| Alkyd | 70 | 70 | 70 |
| Styrene monomer | 30 | 30 | 30 |
| Tert.-butyl catechol | 0.01 | 0.01 | 0.01 |
| Benzoyl peroxide | 2.0 | 2.0 | none |
| Dodecyl mercaptan | 0.1 | none | none |
| Gelling time at 25° C | 23 min | 50 hrs | several months |

This example illustrates clearly the tremendous effect obtained by the use of the combination of mercaptan with the peroxide catalyst in the inhibited resin combination.

EXAMPLE II

Table II lists the gel times which were observed with numerous promoters used in accordance with the invention. The amount of promoter indicated in the table was added to the resin combination consisting of 70 parts of a reactive alkyd produced by the condensation of a polyhydroxy alcohol with an $\alpha,\beta$-ethylenic dicarboxylic acid, 30 parts of monomeric styrene, 0.01 part of tertiary-butyl catechol and 2 parts of benzoyl peroxide in the manner described above.

TABLE II

| Promoter | Conc. (Parts Per 100 Parts of Resin) | Gel Time, Min. at 25° C. |
|---|---|---|
| None | | 3,000 |
| Hydrogen sulfide gas | bubbled in | 30 |
| Sodium hydrosulfide | 2.0 | 60 |
| n-Hexyl mercaptan | 0.2 | 47 |
| n-Heptyl mercaptan | 0.2 | 35 |
| n-Octyl mercaptan | 0.2 | 10 |
| n-Nonyl mercaptan | 0.2 | 122 |
| n-Decyl mercaptan | 0.02 | 20 |
| n-Undecyl mercaptan | 0.2 | 119 |
| n-Dodecyl mercaptan | 0.02 | 30 |
| n-Tridecyl mercaptan | 0.02 | 80 |
| n-Tetradecyl mercaptan | 0.02 | 20 |
| n-Hexadecyl mercaptan | 0.02 | 70 |
| Mercaptoacetic acid | 2.0 | 8 |
| Do | 0.2 | 10 |
| Do | 0.02 | 23 |
| Thiourea | 0.02 | 127 |
| Thiohydantoin | 0.02 | 150 |
| Do | 0.2 | 180 |
| Trithiocyanuric acid | 2.0 | 120 |
| Thiobarbituric acid | 0.2 | 180 |
| Benzenethiol | 0.02 | 120 |
| Do | 0.02 | 25 |
| p-Toluenethiol | 0.2 | 55 |
| Do | 0.02 | 15 |
| p-Mercaptophenol | 0.2 | 15 |
| 2-Mercaptobenzoic acid | 2.0 | 15 |
| Do | 0.2 | 75 |
| Do | 0.02 | 90 |
| Sec. hexyl mercaptan | 0.02 | 48 |
| Tert. hexyl mercaptan | 0.02 | 35 |
| Tert. octyl mercaptan | 0.02 | 25 |

It may be seen from this table that small amounts of any of a large number of sulfhydryl compounds produce a tremendous effect when used in conjunction with benzoyl peroxide catalyst.

EXAMPLE III

The results of further examples of this invention are recorded in Table III. Two parts of benzoyl peroxide are added to a polymerizable mix of a reactive alkyd of Example I and styrene, containing a small amount of inhibitor, as illustrated in Example I, the inhibitor being varied as shown below. The results show the tremendous effect of the promoter on the speed with which the resin gelled in the presence of a variety of inhibitors.

TABLE III

| Inhibitor (0.01 Part) | Gel Times at 25° C. | |
|---|---|---|
| | .05 pt. dodecyl mercaptan | No promoter |
| | Min. | Min. |
| t-butyl catechol | 28 | 900 |
| hydroquinone | 11 | 720 |
| tetrachloroquinone | 18 | 720 |
| phenyl $\beta$-naphthylamine | 11 | 135 |
| benzaldehyde | 10 | 52 |
| none | 8 | 42 |

EXAMPLE IV

Examples of different monoenic monomers having one terminal $CH_2$ group and which can be used with the unsaturated reactive alkyd according to the invention are recorded in Table IV. Thirty parts of each monomer are mixed with 70 parts of the reactive alkyd and 2 parts of benzoyl peroxide with 0.05 part of dodecyl mercaptan are added. The table lists the gel times of the mixtures and shows that the polymerization of all of these mixtures is effected rapidly by means of the combination of the mercaptan and the peroxide.

TABLE IV

| 30 Parts Monomer | Gel Times at 25° C. | |
|---|---|---|
| | .05 pt. dodecyl mercaptan | No Promoter |
| | Min. | Min. |
| Methyl acrylate | 78 | 1,140 |
| Cyclohexyl acrylate | 120 | 720 |
| Methyl methacrylate | 90 | 4,020 |
| Vinyl acetate | 170 | 1,020 |
| Acrylonitrile | 28 | 3,300 |
| Styrene | 8 | 42 |

EXAMPLE V

Table V illustrates the use of different peroxides as catalysts in the systems of resins included in this invention. Two parts of the catalyst are dissolved in 30 parts of styrene containing 0.001 part of tertiary butylcatechol as an inhibitor. This solution is then added to 70 parts of a reactive alkyd as described in Example I. 0.1 part of dodecyl mercaptan is added to a part of this combination and the gel time is determined for the promoted resin and for the resin containing no promoter. It is apparent from the results that the different peroxides are effective in this system.

TABLE V

Activity of Different Peroxides: Gel Times at 25° C.

| | Dodecyl mercaptan added | |
|---|---|---|
| | 0.1 Part | None |
| Benzoyl Peroxide | 12 minutes | 12 hours |
| Lauroyl Peroxide | 40 minutes | 12 hours |
| Tert.-butyl hydroperoxide | 240 minutes | 6 days |

While I have shown and described various embodiments of the invention, it is to be understood that the invention is susceptible to those modi-

Having thus described my invention, what I claim and desire to protect by Letters Patent is:

1. In a method of controlling the oil phase gelling and polymerization of a polymerizable mix comprising a liquid polyenic polyester of a polyhydric alcohol with an alpha-olefinic dicarboxylic acid, and a liquid monomeric unsaturated polymerizable compound in which the unsaturation is due to a single terminal ethylenic group which is attached to a negative radical, and in which said ester is soluble and with which ester it is copolymerizable in the presence of a peroxy polymerization cataylst, said catalyst also being present, that improvement which consists in the step of adding to said system a small but effective amount of a promoter of gelation which is essentially a sulfhydryl compound and which is the sole promoter of gelation.

2. In a method of controlling the oil phase gelling and polymerization of a polymerizable mix comprising a liquid polyenic polyester of a polyhydric alcohol with an alpha-olefinic dicarboxylic acid, and a liquid monomeric unsaturated polymerizable compound in which the unsaturation is due to a single terminal ethylenic group which is attached to a negative radical, and in which said ester is soluble and with which ester it is copolymerizable in the presence of a peroxy polymerization catalyst, said catalyst also being present, that improvement which consists in the step of adding to said system a small but effective amount of a hydrocarbonthiol as a gelation promoter.

3. In a method of controlling the oil phase gelling and polymerization of a polymerizable mix comprising a liquid polyenic polyester of a polyhydric alcohol with an alpha-olefinic dicarboxylic acid, and a liquid monomeric unsaturated polymerizable compound in which the unsaturation is due to a single terminal ethylenic group which is attached to a negative radical, and in which said ester is soluble and with which ester it is copolymerizable in the presence of a peroxy polymerization catalyst, said catalyst also being present, that improvement which consists in the step of adding to said system a small but effective amount of n-dodecyl mercaptan as a gelation promoter.

4. In a method of controlling the oil phase gelling and polymerization of a polymerizable mix comprising a liquid polyhydric alcohol ester of an alpha-olefinic dicarboxylic acid, and a liquid monomeric unsaturated polymerizable compound in which the unsaturation is due to a single terminal ethylenic group which is attached to a negative radical, and in which said ester is soluble and with which ester it is copolymerizable in the presence of a peroxy polymerization caylst, said catalyst also being present, that improvement which consists in the step of adding to said system a small but effective amount of ammonium hydrosulfide as a gelation promoter.

5. A polymerizable mixture comprising a reactive unsaturated alkyd resin derived from an ethylene-alpha, beta-dicarboxylic acid and a glycol, together with a liquid monomeric unsaturated polymerizable compound in which the unsaturation is due to a single terminal ethylenic linkage $CH_2=C<$ which is attached to a negative radical, and in which liquid compound said alkyd is soluble and with which it is copolymerizable in the presence of a peroxidic polymerization catalyst, a peroxidic polymerization catalyst, and a small but effective amount of a promoter of gelation which is essentially a sulfhydryl compound and which is the sole promoter of gelation.

6. A polymerizable mixture comprising a liquid reactive unsaturated glycol ester of an ethylene-alpha, beta-dicarboxylic acid, and a liquid monomeric unsaturated polymerizable compound in which the unsaturation is due to a single terminal ethylenic group which is attached to a negative radical, and in which the said liquid ester is soluble and with which ester it is copolymerizable in the presence of a peroxy polymerization catalyst, and in which the said ester ranges from 20-95% of the mixture of interpolymerizable components, a peroxidic polymerization catalyst, and a small but effective amount of a promoter of gelation which is essentially a sulfhydryl compound and which is the sole promoter of gelation.

CHARLES F. FISK.

REFERENCES CITED

The following references are of record in the file of this patent:

UNITED STATES PATENTS

| Number | Name | Date |
| --- | --- | --- |
| 2,072,465 | Reppe et al. | Mar. 2, 1937 |
| 2,255,313 | Ellis | Sept. 9, 1941 |
| 2,264,376 | Hiltner et al. | Dec. 2, 1941 |
| 2,273,891 | Pollack et al. | Feb. 24, 1942 |
| 2,276,094 | Rothrock | Mar. 10, 1942 |
| 2,281,613 | Wollthan et al. | May 5, 1942 |
| 2,326,736 | Adelson et al. | Aug. 17, 1943 |
| 2,380,475 | Stewart | July 31, 1945 |
| 2,434,054 | Roedel | Jan. 6, 1948 |